A. W. DODGE.
COAL RECORDING DEVICE.
APPLICATION FILED APR. 21, 1913.

1,121,234. Patented Dec. 15, 1914.

Witnesses:

Inventor:
Asa W Dodge
By Lithicum Belt Fuller
Attys

UNITED STATES PATENT OFFICE.

ASA W. DODGE, OF TWO HARBORS, MINNESOTA.

COAL-RECORDING DEVICE.

1,121,234.

Specification of Letters Patent.  Patented Dec. 15, 1914.

Application filed April 21, 1913. Serial No. 762,589.

*To all whom it may concern:*

Be it known that I, ASA W. DODGE, a citizen of the United States, residing at Two Harbors, in the county of Lake and State of Minnesota, have invented certain new and useful Improvements in Coal-Recording Devices, as set forth in the annexed specification.

My invention relates to the operation of boilers and furnaces in connection therewith, and has particular reference to a novel recording device for the fuel consumed in such furnaces.

The invention is particularly adapted for use on locomotives, whereby a record is made of the amount of coal consumed in the furnace and fed through the furnace-door. The device in its preferred form consists in a recording gage which shall graphically show the steam pressure in the boiler over a period of time, the recording chart having time divisions; a counting device adapted to show the number of actuations, and an additional marking device coöperating with the steam-pressure recording chart, the counting and marking devices being operatively connected to the furnace-door, whereby each thereof is actuated when the door is opened or closed. It is the custom of the fireman to allow the furnace-door to remain open only when a single shovel of coal is fed to the furnace; therefore, the counting device will record the number of times the door is opened, and, likewise, the number of shovels of coal fed to the furnace. By obtaining the average weight of coal per shovel the amount of coal fed to the furnace is readily determined. The marking devices for indicating graphically on the steam-pressure recording chart will furnish on one chart a record as to the coal fed to the furnace, the pressure of steam at such time, and the amount of coal consumed over a given period.

Figure 1:
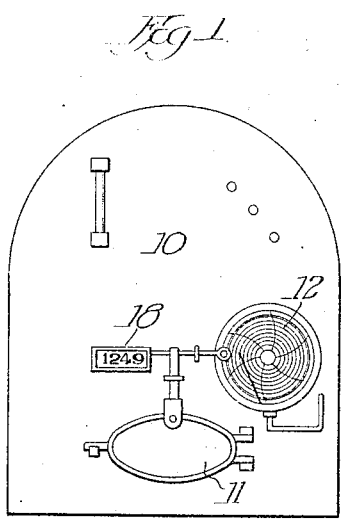
Figure 2:
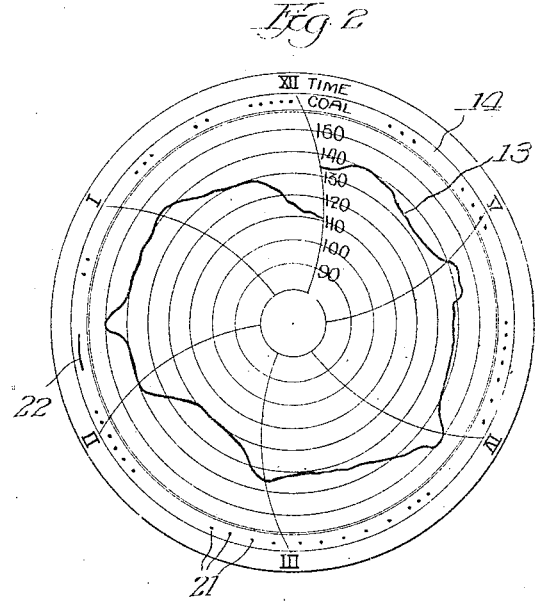
Figure 3:
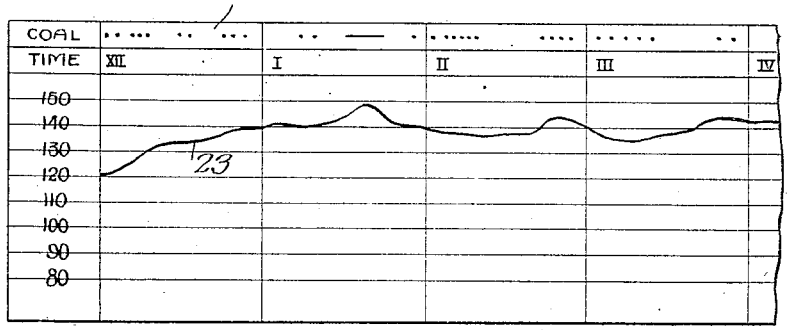
Figure 4:
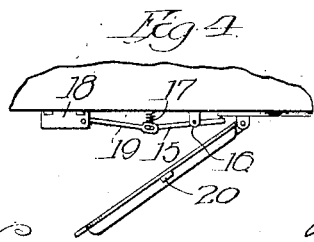

The invention will be more readily understood by reference to the accompanying drawings, wherein, Figure 1 is an end elevation of a locomotive boiler end-sheet having my novel devices applied thereto; Fig. 2 is an enlarged detail of a recording chart having a record of steam pressures and fuel feed over a period of six hours; Fig. 3 is a view of a form of chart which may be employed in place of that shown in Fig. 2, such chart being in the form a continuous roll, and Fig. 4 is a detail plan view of the actuating mechanism for the counting and marking devices.

Referring more particularly to the drawings, it will be understood that in the end-sheet 10 of a locomotive boiler furnace, is a fuel door 11 of the well-known type. On the end-wall is any common or preferred form of a steam-pressure recording gage 12, shown as adapted to accommodate a circular chart. This chart is shown enlarged in Fig. 2 and is divided into six spaces, each space representing one hour in time. The various steam-pressures are arranged radially on the chart and the recording-pencil A, indicated in Fig. 1 makes a continuous mark 13, Fig. 2 which shows graphically pressures at different times. Near the margin of the chart is provided a space 14 within which marks may be made indicating the opening of the furnace-door. Mechanism by which such marking may be accomplished may consist of a lever 15 fulcrumed at 16 and normally pressed outwardly by a coil-spring 17. A counting-device 18 is also provided on the front-wall, this counting-device being actuated by a similar lever 19 also forced outwardly by the spring 17. The door is provided with an upstanding lug 20 adapted to contact the levers 15, 19, and actuate the same. It will be seen that when the door is open the spring 17 forces the lever 15 outward, bringing its free end carrying the marking pencil into contact with the chart, whereby the marks 21, shown in Fig. 2, are made. The long mark in the space 14 indicated at 22 shows that the door was left open during a period of time for the reason that the steam-pressure was raised for some reason, the attendant realizing the necessity for cooling down the furnace.

The construction of the chart shown in Fig. 3 is identical in principle to that shown in Fig. 2. The line 23 indicates the steam-pressures, the chart being divided into spaces corresponding to hours. A space 24 accommodates the marking indicating the consumption of fuel.

I have shown in the accompanying drawings only one form of the device and typical performance sheets. It is evident, however, that the device might take many other forms and I do not, therefore, wish to limit myself to any form of construction other than that to which I am limited by the scope of my claims.

I claim:

1. In a device of the class described, the combination of a steam boiler furnace having a door, a steam pressure chart, and means operable by the furnace door for indicating each actuation of said furnace door on the steam pressure chart, substantially as described.

2. In a device of the class described, the combination of a steam boiler furnace having a door, a steam pressure chart, a counting-device, and means operable by the movement of the furnace door for actuating said counting-device and for indicating each actuation of said furnace door on the chart, substantially as described.

3. In a device of the class described, the combination of a boiler, a furnace having a door, a steam pressure recorder including a chart, a counting device, and means operable by the swinging of said furnace-door for actuating said counting device and for graphically indicating each opening movement of said door on the said chart, substantially as described.

4. A recording device comprising a steam pressure recorder including a chart and a marker actuated by steam pressure, another marker for coöperation with the chart, and means for application to a furnace door for actuating the said other marker to indicate upon the chart the openings and closings of the door.

5. The combination with the fuel door of a steam boiler furnace and the chart of a steam pressure recorder, of a marker in coöperative relation with the chart and also in coöperative relation with the door for actuation thereby.

6. The combination with the fuel door of a steam boiler furnace and the chart of a steam pressure recorder, said chart being provided with time graduations and pressure graduations, of a marker coöperating with the time graduation portion of the chart and also coöperating with the fuel door for actuation thereby.

ASA W. DODGE.

Witnesses:
EDWARD H. WINDOM,
ALEX M. GOW.